(12) United States Patent
Svanteson et al.

(10) Patent No.: US 7,941,441 B2
(45) Date of Patent: May 10, 2011

(54) MEDIA DATA ACCESS SYSTEM AND METHOD

(75) Inventors: Anna Sofia Svanteson, Bromma (SE); Andrea Maria Rosengren, Stockholm (SE); Tom Henrik Airaksinen, Årsta (SE); Jakob Per Edvard Cederquist, Hägersten (SE)

(73) Assignees: Ocean Observations AB, Stockholm (SE); Ikivo AB, Bromma (SE)

( * ) Notice: Subject to any disclaimer, the term of this patent is extended or adjusted under 35 U.S.C. 154(b) by 437 days.

(21) Appl. No.: 12/029,099

(22) Filed: Feb. 11, 2008

(65) Prior Publication Data

US 2008/0228786 A1    Sep. 18, 2008

Related U.S. Application Data

(60) Provisional application No. 60/889,376, filed on Feb. 12, 2007.

(51) Int. Cl.
*G06F 7/00* (2006.01)
*G06F 17/30* (2006.01)
*G06F 13/14* (2006.01)

(52) U.S. Cl. .................. 707/778; 707/705; 707/758
(58) Field of Classification Search .......... 707/778; 709/201–217; 84/609
See application file for complete search history.

(56) References Cited

U.S. PATENT DOCUMENTS

| | | | |
|---|---|---|---|
| 6,877,134 B1 | 4/2005 | Fuller et al. | |
| 7,136,874 B2 * | 11/2006 | Mercer et al. | 707/693 |
| 7,590,659 B2 * | 9/2009 | Mercer et al. | 1/1 |
| 7,636,509 B2 * | 12/2009 | Davis | 386/239 |
| 2004/0175098 A1 | 9/2004 | Calhoon et al. | |

\* cited by examiner

*Primary Examiner* — Cam Y Truong
*Assistant Examiner* — Cecile Vo
(74) *Attorney, Agent, or Firm* — Alston & Bird LLP (57) ABSTRACT

In a solution for accessing digital media files, in which each file is associated with a tag characterizing information in the file, a data storage stores the media files. An input interface receives commands and forwards them to a data processor. An output interface presents graphical representations of the media files on a user comprehensible format. The data processor causes the output interface to present an adjusted graphical representation of the media files, organizes the media files according to a hierarchical and layered structure, and causes the output interface to present information reflecting the structure. A bottom layer comprises a graphic representation of an individual file. A top layer contains a two-dimensional layout of at least two category segments that are each associated with one or more of the media files. Edges between segments designate that media files associated with one segment are different from media files associated with the other segment regarding at least one disparity criterion.

48 Claims, 3 Drawing Sheets

Fig. 4

MEDIA DATA ACCESS SYSTEM AND METHOD

CROSS-REFERENCE TO RELATED APPLICATIONS

This application claims the benefit of U.S. Provisional Application No. 60/889,376, filed Feb. 12, 2007, which is incorporated by reference herein in its entirety.

BACKGROUND OF THE INVENTION

The present invention relates generally to solutions for accomplishing user-friendly access to media files. More particularly, the invention relates to a system for accessing digital media files representing audio and/or visual information, and a corresponding method. The invention also relates to a computer program product configured to implement the proposed method, and a computer readable medium having a program recorded thereon, where the program is to make a data-processing apparatus control the proposed method.

Today, media data, e.g. files representing music, video and/or still images gain increasing importance. Inter alia, this is an effect of that modern portable media players have become relatively capable (i.e. are equipped with powerful processors, high resolution screens and resourceful storage devices). However, as a result, the media player user is confronted with large amounts of complex information, in which it may be intricate to navigate and difficult to find specific files, or groups thereof.

The published US patent application 2004/0175098 describes a personal media player capable of reproducing data in the form of video, audio and still images ported from sources outside of the player itself. A user interface here includes a display unit, and the user interface is functionally coupled to a digital media processing system. Thereby, a user may control the operation of the device. The display unit is also functionally coupled to the digital media processing system. Thus, The display unit may also functionally support and compliment the operation of the user interface by providing visual and audio output to the user during operation.

U.S. Pat. No. 6,877,134 discloses a solution for a digital capture system, such as a digital encoder, having an embedded real-time content-based analysis function to extract metadata from the digital signals. Hence, metadata (descriptive information about the digital content) may be produced in real-time during the encoding process. The metadata is either stored separately from the content, or is formatted and combined with the digital content in a container format, such as MPEG-7, QuickTime, or FlashPix. The metadata, in turn, generally falls into two broad categories referred to as collateral metadata and content-based metadata respectively. The collateral metadata may include date, time, camera properties, and user labels or annotations etc., while the content-based meta-data may include information extracted automatically by analyzing the audiovisual signal and extracting properties from it (e.g. key frames, speech-to-text, speaker ID, visual properties, face identification/recognition, optical character recognition (OCR) etc.).

Although the above-mentioned solutions represent efficient strategies to generate and reproduce various forms of digital media files, there is yet no satisfying technical solution for structuring large amounts of media information and presenting this information to a user in a straightforward and highly intuitive manner.

SUMMARY OF THE INVENTION

The object of the present invention is therefore to provide a solution, which solves the above problems and thus offers an efficient and convenient access to a comparatively large number of media files.

According to one aspect of the invention, the object is achieved by a system for accessing digital media files representing audio and/or visual information, where each file is associated with at least one tag characterizing at least one aspect of the nature of said information. The system includes at least one data storage, an input interface, an output interface and a data processor. The at least one data storage is configured to store the media files. The media files may either be stored in a single device (e.g. a portable media player), or in a plurality of units (e.g. being associated with a given media player over one or more networks). The input interface is configured to receive operator-generated commands, e.g. via keys, buttons, a touch screen or voice control. The output interface is configured to present graphical representations of the media files on a format comprehensible to a human user (e.g. in the form of on-screen GUI-objects). The data processor is configured to organize the media files according to a hierarchical structure based on the at least one tag associated with each file. Moreover, the data processor is configured to cause the output interface to present information reflecting said structure. The structure, in turn, includes a top-level layer and a bottom-level layer. The top-level layer contains a two-dimensional layout of at least two category segments. Here, each category segment is associated with one or more of the media files, and each category segment represents an area delimited by a number of edges. Additionally, each category segment adjoins at least one other segment along at least one of its edges. An edge between first and second category segments designates that the media files associated with the first category segment are different from the media files associated with the second category segment with respect to at least one disparity criterion (e.g. symbolizing that the media files in the first category represent music of a first type, whereas the media files in the second category represent music of a second type). However, preferably, the fact that the first and second category segments adjoin each other also mean that the files in these two segments show similarities. The bottom-level layer of the hierarchical structure includes a graphic representation of an individual file of the media files (e.g. a particular song). Furthermore, the data processor is configured to receive any operator-generated commands, and in response thereto cause the output interface to present an adjusted graphical representation of the media files (i.e. reflecting an effect of the received command(s)).

This system is advantageous because it allows an intuitive "zooming" in the data, i.e. the user may approach a general area of information, and then gradually increase the search precision by stepping down in the hierarchical structure. Moreover, since the structure is hierarchical and neighboring category segments contain similar media files, a user browsing through the structure while aiming for a particular kind of information may be inspired to also investigate related media files. As a result, he/she might encounter pleasant surprises.

According to one preferred embodiment of this aspect of the invention, the hierarchical structure includes at least one intermediate layer between the top-level layer and the bottom-level layer. Each intermediate layer represents sub-divisions of one or more category segments of a layer at a hierarchical level above said intermediate layer. Analogous to the above, each intermediate layer contains a two-dimensional layout of at least two category segments, where each category segment is associated with one or more of the media files. Moreover, each category segment represents an area delimited by a number of edges, and each category segment adjoin at least one other category segment along at least one of its edges. Again, an edge between a first and a second category segment designates that the media files associated with the first category segment are different from the media files associated with the second category segment with respect to at least one disparity criterion. Here, the at least one disparity criterion is defined in relation to the sub-divisions at the intermediate layer. The intermediate layers are advantageous because thereby, the data can be arranged into a multitude of abstraction levels. This in turn, facilitates browsing through the data, especially if the number of media files is large.

According to another preferred embodiment of this aspect of the invention, the data processor is configured to present a feature listing together with the graphic representation of the individual file at the bottom-level layer. The feature listing is included in the at least one tag associated with the file, and this listing contains data revealing at least one characterizing feature of the file. Hence, for digital still images, so-called Exif data and IPTC (International Press Telecommunications Council) headers may be presented, and for audio files, metadata in the form of genre, album, artist and release date may be displayed, i.e. information which is generally helpful for the user.

According to a further preferred embodiment of this aspect of the invention, the feature listing includes at least one variable data field. Moreover, the data processor is configured to assign the contents of the least one variable data field in response operator-generated commands received in respect of the media file to which the feature listing is associated. In short, the contents of the feature listing may be manipulated, either manually by the user, or automatically by the data processor. For example, the number of times that the media file has been reproduced may be reflected in the feature listing.

According to yet another preferred embodiment of this aspect of the invention, the data processor is configured to determine an intensity parameter reflecting a frequency at which each media file has been reproduced relative to the other the media files included in the hierarchical structure. Additionally, the data processor is configured to assign the contents of at least one of the at least one variable data field in response to the intensity parameter. The intensity parameter, in turn, may serve as a basis for creating the proposed structure. For example, the data processor may be configured to cause the output interface to present at least one graphic representation at one or more layers of the hierarchical structure, which graphic representation visualizes the intensity parameter in respect of at least one media file This means that category segments containing a comparatively large proportion of high-frequency files may be allocated one color, say red; and category segments containing predominantly low-frequency files may be allocated another color, say blue. Naturally, this further enhances the quality of the user interface to the media files. Further preferably, a magnitude of the intensity parameter is expressed by a tone and/or an intensity of at least one color assigned to at least one onscreen object presented via the output interface.

According to still another preferred embodiment of this aspect of the invention, the data processor is configured to examine at least one tag associated with a new media file added to the at least one data storage. Based thereon, the data processor is configured to assign the new media file to at least one category segment at one or more levels of the hierarchical structure. Hence, the structure may grow gradually as more files are added, while the hierarchical principle is maintained unaltered.

Preferably, the data processor is specifically configured to assign a position for the new media file relative to any media files already organized in the hierarchical structure. Here, the position for the new file is assigned based on the at least one tag associated with the new media file relative to a respective at least one tag associated with the media files already organized in the hierarchical structure.

According to another preferred embodiment of this aspect of the invention, the input interface is configured to receive the operator-generated commands in the form of navigation instructions relative to the hierarchical structure. The navigation instructions express a traversal between different category segments at a particular layer, a traversal between graphic representations of different media files at the bottom-level layer and/or an alteration of layers. In other words, this means that a user may browse through the media files by stepping between segments within a given layer and/or stepping up and down between different layers, and thus expand or narrow the search.

According to a further preferred embodiment of this aspect of the invention, the input interface is configured to receive the operator-generated commands in the form of a selection of a media file. This may involve displaying a feature listing associated with the file. Based thereon, the user may then decide whether or not the file shall be reproduced.

According to one preferred embodiment of this aspect of the invention, the system is associated with at least one media player, and the operator-generated commands include an instruction to reproduce a selected media file in one of the at least one media player. Hence, reproduction of a selected file may be effected.

According to another aspect of the invention, the object is achieved by a method of accessing digital media files stored in at least one data storage, where each file representing audio and/or visual information. It is assumed that each file is associated with at least one tag that characterizes at least one aspect of the nature of said information. The method involves presenting graphical representations of the media files on a format comprehensible to a human user. The method further involves organizing the media files according to a hierarchical structure based on the at least one tag associated with each file. The output interface is caused to present information reflecting said structure and cause. The structure, in turn, includes a top-level layer and a bottom-level layer. The top-level layer contains a two-dimensional layout of at least two category segments, where each category segment is associated with one or more of the media files. Each category segment represents an area delimited by a number of edges, and each category segment adjoins at least one other segment along at least one of its edges. An edge between a first category segment and a second category segment designating that the media files associated with the first category segment are different from the media files associated with the second category segment with respect to at least one disparity criterion. However, preferably, the fact that the first and second category segments adjoin also mean that the files in these two segments are relatively similar to one another. The bottom-level layer includes a graphic representation of an individual file of the media files. Additionally, the method involves receiving operator-generated commands, and in response thereto presenting an adjusted graphical representation of the media files.

The advantages of this method, as well as the preferred embodiments thereof, are apparent from the discussion hereinabove with reference to the proposed system.

According to a further aspect of the invention the object is achieved by a computer program product, which is loadable into the internal memory of a computer, and includes software for controlling the above proposed method when said program is run on a data-processing apparatus.

According to another aspect of the invention the object is achieved by a computer readable medium, having a program recorded thereon, where the program is to control a dataprocessing apparatus to perform the above proposed method.

Further advantages, advantageous features and applications of the present invention will be apparent from the following description and the dependent claims.

BRIEF DESCRIPTION OF THE

The present invention is now to be explained more closely by means of preferred embodiments, which are disclosed as examples, and with reference to the attached drawings.

DESCRIPTION OF PREFERRED
EMBODIMENTS OF THE INVENTION

Figure 1:
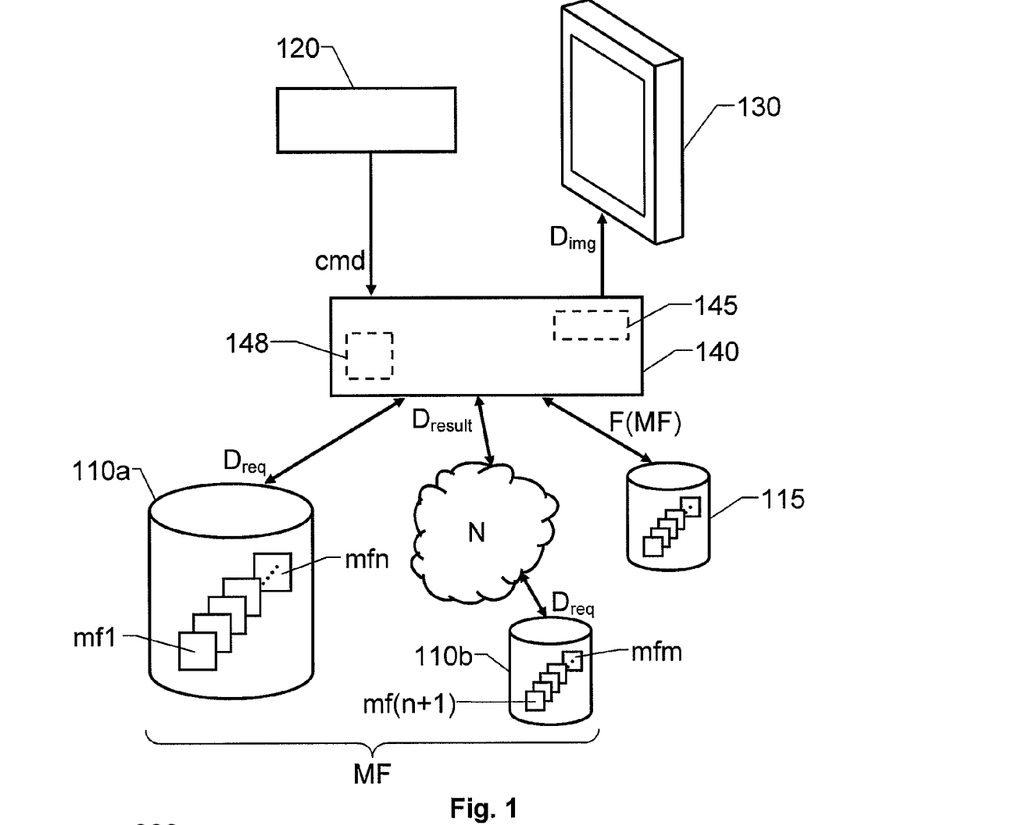
FIG. 1 shows a block diagram over a system for accessing digital media files according to one embodiment of the invention.

We refer initially to FIG. 1, which shows a block diagram over a system for accessing digital media files according to one embodiment of the invention. It is presumed that the media files represent audio and/or visual information, and that each file is associated with at least one tag characterizing at least one aspect of the nature of said information. For example this means that the tag may include data relating to data format, date, time, camera properties, Exif data and/or IPTC headers (for still images), genre, album, artist and/or release date (for audio files), key frames, director, producer and/or actor listing (for video files).

The system includes one or more data storages 110*a* and 110*b*, an input interface 120, an output interface 130 and a data processor 140. All these components may either be incorporated in a single unit, or be included in two or more units. For instance, a first data storage 110*a*, co-located with the data processor 140 may store a first set of media files mf1 through mfn, and a second data storage 110*b*, physically separated from the data processor 140 may store a second set of media files mf(n+1) through mfm. Here, the second data storage 110*b* is accessed by the data processor 140 via a network N, such as the Internet. In any case, each data storage 110*a* and 110*b* respectively is configured to store media files MF of the above-mentioned type.

The input interface 120 is configured to receive operator-gene-rated commands cmd. Thus, the input interface 120 may include input members in the form of keys, buttons, a joystick, a joy ball, scroll wheels, a computer mouse, a touchpad and a touchscreen. Alternatively, or in addition thereto, the input interface 120 may also include a voice recognition means configured to receive voice commands and/or an eye tracking means configured to register gaze data, and based thereon produce control signals.

The output interface 130 is configured to present graphical representations of the media files MF on a format comprehensible to a human user. This means that the output interface 130 includes at least one display unit, preferably a digital color screen.

The data processor 140 has connections to the data storages 110*a* and 110*b*, the input interface 120 and the output interface 130, such that the operator-generated commands cmd and the media files MF may be processed therein, and resulting information may presented via the output interface 130. Specifically, the data processor 140 is configured to receive the operator-generated commands cmd, and in response thereto cause the output interface 130 to present an adjusted graphical representation of the media files MF.

Figure 2:
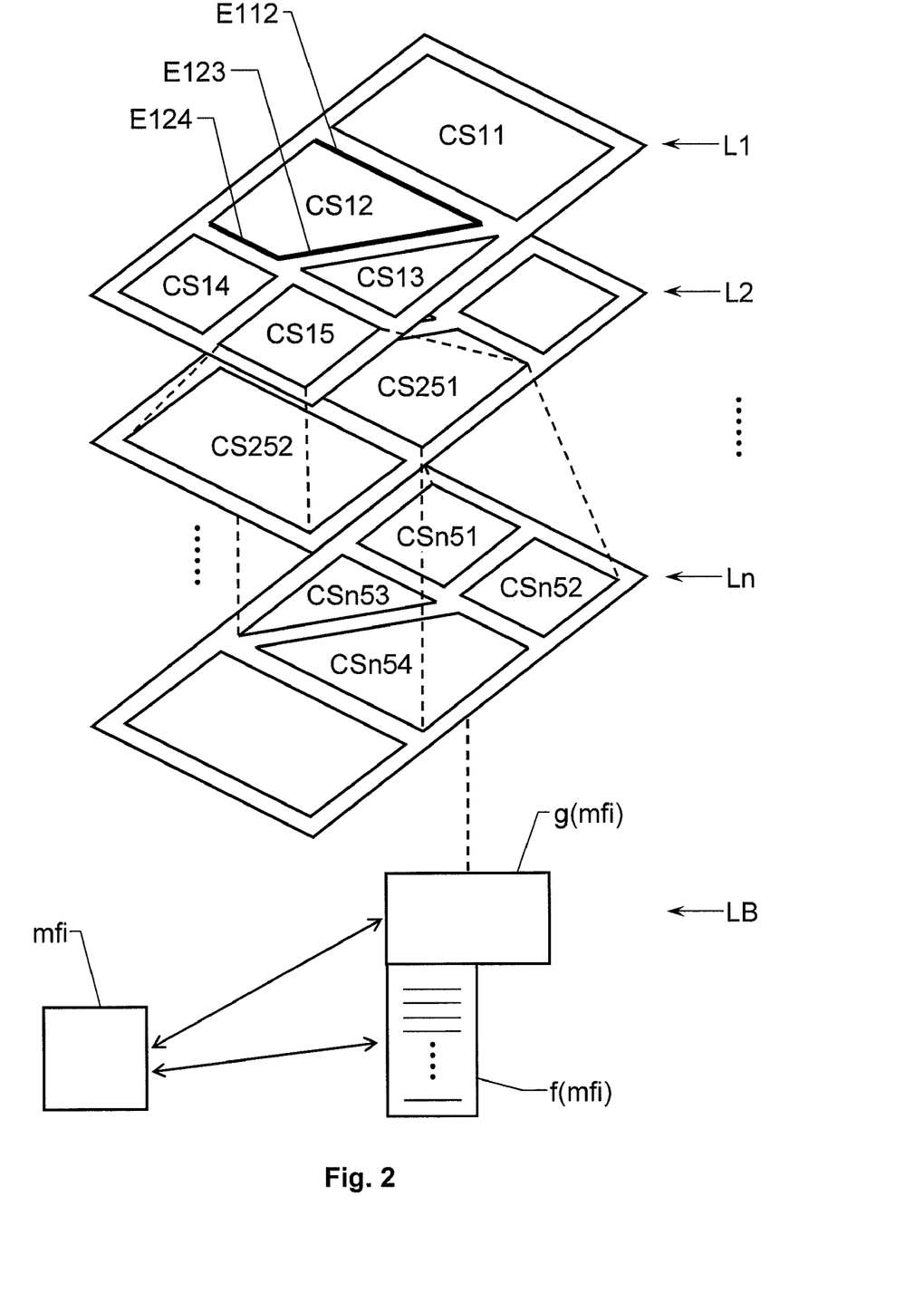
FIG. 2 exemplifies the proposed hierarchical structure according to which the invention organizes media files.

The data processor 140 is further configured to organize the media files MF according to a hierarchical structure based on the at least one tag associated with each file. Referring now also to FIG. 2, we see an example of such a hierarchical structure. The data processor 140 is further configured to cause the output interface 130 to present information reflecting said structure (e.g. by means of interactive computer graphics).

The structure typically has a plurality of layers. However, in any case, the structure at least includes a top-level layer L1 and a bottom-level layer LB. The top-level layer L1 contains a two-dimensional layout of at least two category segments, here CS11, CS12, CS13 and CS14 respectively. Each category segment is associated with one or more of the media files MF. This means that a first category segment CS11 may include digital audio files embodying jazz music, a second category segment CS12 may include digital audio files embodying pop music, and so on. Each category segment represents an area delimited by a number of edges In FIG. 2, the category segment CS12 is delimited by the edges E112, E123 and E124 plus a left-most edge towards a border of the display area. Each category segment adjoins at least one other segment. For example, the segment CS12 adjoins segments CS11, CS13 and CS14 along its edges E112, E123 and E124 respectively. Additionally, the segment CS12 may be defined to adjoin the segment CS13 along the left-most edge of the segment CS12 and a right-most edge of the segment CS13 (i.e. L1 is regarded as a 'sphere', where the left and right edges represent a first identical edge and the top and bottom edges represent a second identical edge). Moreover, an edge, say E112 between the segment CS11 and the segment CS12, designates that the media files MF (jazz music) associated with the segment CS11 are different from the media files MF (pop music) associated with the segment CS12 with respect to at least one disparity criterion. In this example, the music genre constitutes such a difference. However, technically, the disparity criterion may be selected such that any other difference decides which files are associated with which segment.

The bottom-level layer LB includes a graphic representation g(mfi) of an individual file mfi of the media files MF. The graphic representation g(mfi) may contain a thumbnail picture of an album, a video or an artist. Preferably, at the bottom-level layer LB, the data processor 140 is also configured to present a feature listing f(mfi) together with the graphic representation g(mfi). The feature listing f(mfi) is included in the above-mentioned tag that is associated with the file (mfi), and the feature listing (f(mfi)) contains data revealing at least one characterizing feature of the file mfi. Hence, the feature listing f(mfi) may specify data format, rating information, a number of times that the file has been reproduced, date, time, camera properties, Exif data and/or IPTC headers (for still images), genre, album, artist and/or release date (for audio files), key frames, director, producer and/or actor listing (for video files). The feature listings F(MF) for all the media files MF may be stored in a separate database 115, which preferably however not necessarily is included in the same unit as the data processor 140.

According to one preferred embodiment of the invention, the feature listing f(mfi) includes at least one variable data field. Such a data field may be modified manually (by a user), or automatically (by the system). In the former case, the data processor 140 is configured to assign the contents of the least one variable data field in response operator-generated commands cmd received in respect of the media file mfi to which the feature listing f(mfi) is associated. In practice, this may mean that a user can rate the media files in relation to his/her personal preferences.

In the case of automatic modification, the data processor 140 may be configured to determine an intensity parameter that reflects a frequency at which each media file mfi has been reproduced relative to the other the media files MF included in the hierarchical structure. The data processor 140 is further configured to assign the contents of at least one of the at least one variable data field in response to the intensity parameter. Preferably, the data processor 140 is likewise configured to cause the output interface 130 to present at least one graphic representation at one or more layers L1, L2, Ln and/or LB of the hierarchical structure, which graphic representation visualizes the intensity parameter in respect of at least one media file MF. For instance, a color may reflect the intensity parameter, and a tone and/or an intensity of the color may express the magnitude of the parameter as parts of the graphical data of an onscreen object presented via the output interface 130.

Here, a relatively high frequency can be allocated a warm color, say red or orange, and a relatively low frequency can be allocated a cool color, such as blue or grey. Thus, deep red symbolizes a "hot" category, and vice versa.

As already mentioned, the proposed structure may include a plurality of layers. Here, any layers in addition to top level-layer L1 and the bottom-level layer LB, will be organized between the top and bottom level-layers L1 and LB respectively. FIG. 2 shows two such intermediate layers L2 and Ln. Each intermediate layer, say L2, represents sub-divisions of one or more category segments of a layer, L1, at a hierarchical level above the intermediate layer L2 in question. For example, a category segment CS15 at the top level-layer L1 may be represented by two category segments CS251 and CS251 at the intermediate level-layer L2.

Analogous to the above, each intermediate layer contains a two-dimensional layout of at least two category segments, e.g. CS251 and CS252, where each segment is associated with one or more of the media files MF. Typically, the intermediate layer constitutes sub-divisions of a higher layer. This means that if the category segment CS15 includes digital audio files embodying rock music, the category segments CS251 and CS252 may include digital audio files embodying rock 'n roll and hard rock respectively. Again, each category segment represents an area delimited by a number of edges, and each category segment adjoins at least one other category segment along at least one of its edges. Moreover, an edge between a first category segment, say CS251, and a second category segment, say CS252, designates that the media files MF associated with the first category segment CS251 are different from the media files MF associated with the second category segment CS252 with respect to at least one disparity criterion. Naturally, the at least one disparity criterion is defined in relation to the sub-divisions at the intermediate layer in question, i.e. in this case layer L2.

Another intermediate layer Ln below the layer L2 may constitute further sub-divisions of the media files MF. For example the category segment CS252 at layer L2 may correspond to four category segments CSn51, CSn52, CSn53 and CSn54 at layer Ln, where a first segment CSn51 includes digital audio files embodying old school heavy metal, a second segment CSn52 includes digital audio files embodying nu metal, a third segment CSn53 includes digital audio files embodying trash metal, and a fourth segment CSn54 includes digital audio files embodying death metal.

Technically, it is not excluded that one media file mfi is associated with two or more category segments. Thus, a particular media file mfi may be accessed via the segment CSn51 and the segment CSn54, if this file can be regarded as examples of both old school heavy metal and death metal. Of course, since media files included in category segment adjoining one another must fulfill a disparity criterion, duplicate associations of this kind cannot be made with respect to adjoining category segments.

According to one preferred embodiment of the invention, the system is adapted to automatically organize added media files into the existing hierarchical structure. To this end, the data processor 140 is configured to examine at least one tag associated with a new media file mfi having been added to one of the data storage 110a or 110b. Based on the examination, the data processor 140 is configured to assign the new media file mfi to at least one category segment at one or more levels of the hierarchical structure. For example, this may involve associating the file mfi with the above-mentioned category segment CS12 relating to pop music.

Further preferably, the data processor 140 is configured to assign a position for the new media file mfi relative to the media files MF already organized in the hierarchical structure, such that the position is assigned based on the at least one tag associated with the new media file mfi relative to a respective at least one tag associated with the media files MF already organized in the hierarchical structure. Referring again to the category CS12, the file mfi may be given a position comparatively close to other audio files from the same artist, and/or audio files representing similar music.

According to one preferred embodiment of the invention, the input interface 120 is configured to receive the operator-generated commands cmd in the form of navigation instructions relative to the hierarchical structure, such that a truly free browsing through the structure is enabled, i.e. laterally as well as up and down. Hence, the navigation instructions may express: a traversal between different category segments at a particular layer L1, L2, Ln or LB, a traversal between graphic representations g(mfi) of different media files mfi at the bottom-level layer LB and/or an alteration of layers, (i.e. in FIG. 2, between L1 and L2, between L2 and Ln, or between Ln and LB). Here, it is important to underline that the browsing is not bound to the specific hierarchical structure. On the contrary, the user may browse laterally, i.e. between different branches of the structure, independently of how these branches are connected. Naturally, this enhances the overall navigation speed through the media files MF. In fact, the user interaction is similar to that of today's digital maps, where at each zoom level (here layer) traversal is possible in any direction; and zooming in and out (here alteration of layers) is possible.

In FIG. 1, the navigation instructions may generate a data request $D_{req}$ from the data processor 140 to at least one of the data storages 110a and 110b. In response to the data request $D_{req}$, the data processor 140 receives result data $D_{result}$ from the data storage concerned 110a or 110b. In response to the result data $D_{result}$, the data processor 140, in turn, preferably generates image data $D_{img}$ for presentation via the output interface 130.

Furthermore, the system is preferably adapted to allow a user to select, and possibly manipulate, the media files MF. Therefore, the input interface 120 is configured to receive the operator-generated commands cmd expressing selection of a media file. In response to such a selection command, the data processor 140 may cause the output interface 130 to highlight the selected media file mfi, e.g. by displaying a graphic representation g(mfi) of the file mfi in a distinctive color and/or tone, and/or showing a graphic representation g(mfi) of the file mfi that is larger than the graphic representation of other files. Corresponding data are also included in the image data $D_{img}$ sent to the output interface 130.

Additionally, the user may display the feature listing f(mfi) being associated with the selected media file mfi. For this purpose, the operator-generated commands cmd may include a specific display instruction.

Preferably, the data processor 140 includes, or is associated with, a computer readable medium 148, e.g. in the form of a memory module, such that the data processor 140 has access to the contents of this medium 148. Furthermore, a program is recorded in the computer readable medium 148, and the program is adapted to make the data processor 140 control the above-described process when the program is run on the processor 140.

Figure 3:
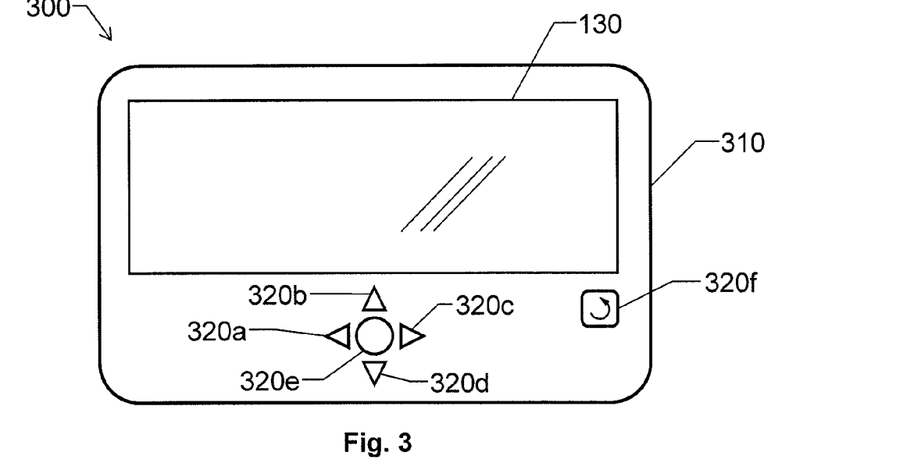
FIG. 3 illustrates, schematically, a media player device incorporating the proposed system.

Referring to FIG. 3, we will now explain further details regarding the input and output interfaces 120 and 130 respectively. FIG. 3 schematically illustrates a media player device 300 that incorporates the proposed system.

The device 300 includes an interface 130 in the form of a display (e.g. including a color LCD screen), and an input interface represented by navigation buttons 320a, 320b, 320c and 320d, a selection button 320e and a return/home button 320f. Additionally, the device 300 may include a loudspeaker means (not shown) and/or contact means (not shown) configured to be connected to various forms of external acoustic transducers (e.g. earphones or headphones) for converting electrical or optical signals into sound.

By manipulating the navigation buttons 320a, 320b, 320c and 320d a user may enter browse commands cmd relative to the proposed hierarchical structure of media files; and by operating the button 320e, the user may order selection of a specific media file mfi. Further activation of the button 320e may then cause the selected file mfi to be reproduced in media player.

Figure 4:
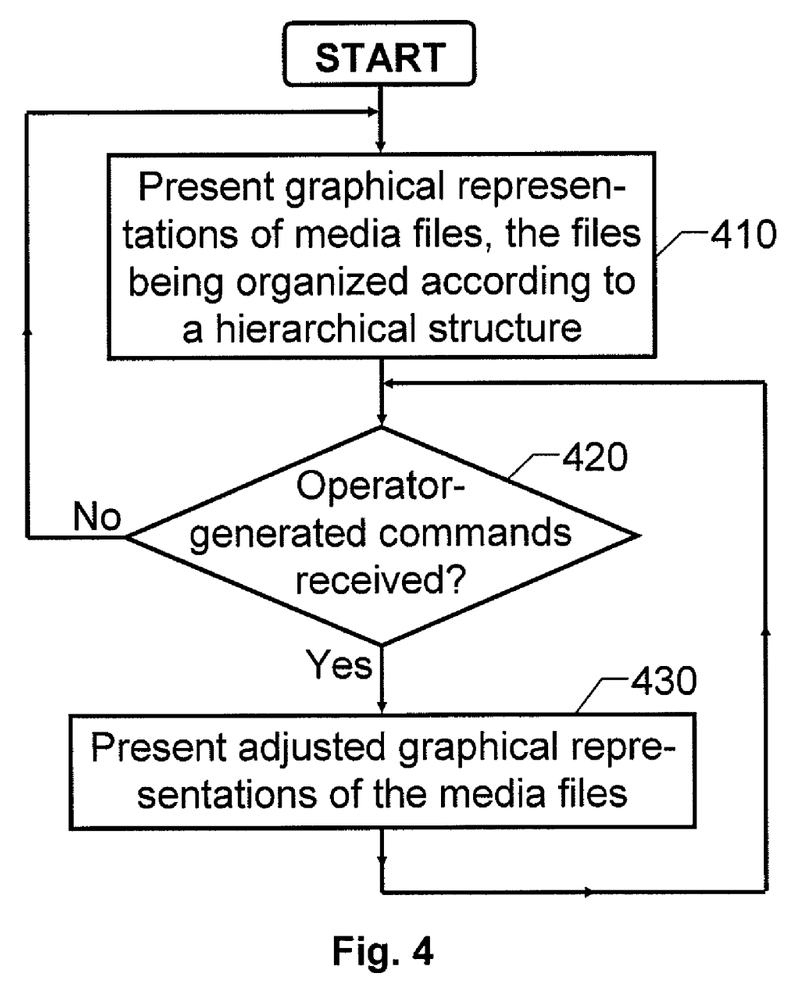
FIG. 4 illustrates, by means of a flow diagram, the general method of accessing digital media files according to the invention.

To sum up, the general method of accessing digital media files according to the invention will now be described with reference to the flow diagram in FIG. 4.

An initial step 410 presents graphical representations of the media files on a format comprehensible to a human user, e.g. in the form of graphics on a display device. As described above, the media files are organized according to a hierarchical structure based on at least one tag associated with each file. A step 420 thereafter investigates whether or not operator-generated commands have been received in respect of the media files. If such a command is received, a step 430 follows. Otherwise, the procedure loops back to step 410.

Step 430 presents an adjusted graphical representation of the media files. Subsequently, the procedure loops back to step 420.

All of the process steps, as well as any sub-sequence of steps, described with reference to the FIG. 4 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The invention is not restricted to the described embodiments in the figures, but may be varied freely within the scope of the claims.

The invention claimed is:

1. A system for accessing digital media files representing audio and/or visual information, each file being associated with at least one tag characterizing at least one aspect of the nature of said information, the system comprising:

at least one data storage configured to store media files,
an input interface configured to receive operator-generated commands,
an output interface configured to present graphical representations of the media files on a format comprehensible to a human user, and
a data processor configured to:
organize the media files according to a hierarchical structure based on the at least one tag associated with each file, and cause the output interface to present information reflecting said structure, the structure comprising a top-level layer and a bottom-level layer, the top-level layer containing a two-dimensional layout of at least two category segments, each category segment being associated with one or more of the media files, each category segment representing an area delimited by a number of edges, and each category segment adjoining at least one other segment along at least one of its edges, an edge between a first category segment and a second category segment designating that the media files associated with the first category segment are different from the media files associated with the second category segment with respect to at least one disparity criterion, the category segments being organized such that the media files included in adjacent category segments are more similar to one another than the media files included in non-adjacent category segments, the bottom-level layer comprising a graphic representation of an individual file of the media files,
receive the operator-generated commands, and in response thereto cause the output interface to present an adjusted graphical representation of the media files, determine an intensity parameter reflecting a frequency at which each media file has been reproduced relative to the other the media files included in the hierarchical structure, and assign the contents of at least one of the at least one variable data field in response to an intensity parameter.

2. The system according to claim 1, wherein the hierarchical structure comprises at least one intermediate layer between the top-level layer and the bottom-level layer, each intermediate layer representing sub-divisions of one or more category segments of a layer at a hierarchical level above said intermediate layer, each intermediate layer containing a two-dimensional layout of at least two category segments, where each category segment is associated with one or more of the media files, each category segment representing an area delimited by a number of edges, and each category segment adjoining at least one other category segment along at least one of its edges, an edge between a first category segment and a second category segment designating that the media files associated with the first category segment are different from the media files associated with the second category segment with respect to at least one disparity criterion, the at least one disparity criterion being defined in relation to the sub-divisions at the intermediate layer.

3. The system according to claim 1, wherein the data processor is configured to present a feature listing together with the graphic representation of the individual file at the bottom-level layer, the feature listing being included in the at least one tag associated with the file and the feature listing comprising data revealing at least one characterizing feature of the file.

4. The system according to claim 3, wherein the feature listing comprises the at least one variable data field, and the data processor is configured to assign the contents of the least one variable data field in response operator-generated commands received in respect of the media file to which the feature listing is associated.

5. The system according to claim 4, wherein the data processor is configured to cause the output interface to present at least one graphic representation at one or more layers of the hierarchical structure which graphic representation visualizes the intensity parameter in respect of at least one media file.

6. The system according to claim 5, wherein the intensity parameter is reflected by color, and a magnitude of the parameter is expressed by at least one of a tone and an intensity of at least one color assigned to at least one onscreen object presented via the output interface.

7. The system according to claim 1, wherein the data processor is configured to:

examine at least one tag associated with a new media file added to the at least one data storage, and based thereon assign the new media file to at least one category segment at one or more levels of the hierarchical structure.

8. The system according to claim 7, wherein the data processor is configured to assign a position for the new media file relative to any media files already organized in the hierarchical structure, the position being assigned based on the at least one tag associated with the new media file relative to a respective at least one tag associated with the media files already organized in the hierarchical structure.

9. The system according to claim 1, wherein the input interface is configured to receive the operator-generated commands in the form of navigation instructions relative to the hierarchical structure, the navigation instructions expressing at least one of:

traversal between different category segments at a particular layer, traversal between graphic representations of different media files at the bottom-level layer, and alteration of layers.

10. The system according to claim 1, wherein the input interface is configured to receive the operator-generated commands in the form of a selection of a media file.

11. The system according to claim 10, wherein the operator-generated commands comprise an instruction pertaining to displaying the feature listing associated with a selected media file.

12. The system according to claim 10, wherein the system is associated with at least one media player, and the operator-generated commands comprise an instruction to reproduce a selected media file in one of the at least one media player.

13. A method of accessing digital media files stored in at least one data storage, each file representing audio and visual information, and each file being associated with at least one tag characterizing at least one aspect of the nature of said information, the method comprising:

presenting graphical representations of media files on a format comprehensible to a human user, organizing the media files according to a hierarchical structure based on the at least one tag associated with each file, and cause the output interface to present information reflecting said structure, the structure comprising a top-level layer and a bottom-level layer, the top-level layer containing a two-dimensional layout of at least two category segments, each category segment being associated with one or more of the media files, each category segment representing an area delimited by a number of edges, and each category segment adjoining at least one other segment along at least one of its edges, an edge between a first category segment and a second category segment designating that the media files associated with the first category segment are different from the media files associated with the second category segment with respect to at least one disparity criterion, the category segments being organized such that the media files included in adjacent category segments are more similar to one another than the media files included in non-adjacent category segments, the bottom-level layer comprising a graphic representation of an individual file of the media files, receiving operator-generated commands, and in response thereto presenting an adjusted graphical representation of the media files, determine an intensity parameter reflecting a frequency at which each media file has been reproduced relative to the other the media files included in the hierarchical structure, and assign the contents of at least one of the at least one variable data field in response to an intensity parameter.

14. The method according to claim 13, wherein the hierarchical structure comprises at least one intermediate layer between the top-level layer and the bottom-level layer, each intermediate layer representing sub-divisions of one or more category segments of a layer at a hierarchical level above said intermediate layer, each intermediate layer containing a two-dimensional layout of at least two category segments, where each category segment is associated with one or more of the media files, each category segment representing an area delimited by a number of edges, and each category segment adjoining at least one other category segment along at least one of its edges, an edge between a first category segment and a second category segment designating that the media files associated with the first category segment are different from the media files associated with the second category segment with respect to at least one disparity criterion, the at least one disparity criterion being defined in relation to the sub-divisions at the intermediate layer.

15. The method according to claim 13, comprising presenting a feature listing together with the graphic representation of the individual file at the bottom-level layer, the feature listing being included in the at least one tag associated with the file and the feature listing comprising data revealing at least one characterizing feature of the file.

16. The method according to claim 15, wherein the feature listing comprises the at least one variable data field, and the method comprising assigning the contents of the least one variable data field in response operator-generated commands received in respect of the media file to which the feature listing is associated.

17. The method according to claim 16, comprising presenting at least one graphic representation at one or more layers of the hierarchical structure which graphic representation visualizes the intensity parameter in respect of at least one media file.

18. The method according to claim 17, wherein the intensity parameter is reflected by color, and a magnitude of the parameter is expressed by at least one of a tone and an intensity of at least one color assigned to at least one onscreen object presented via the output interface.

19. The method according to claim 13, comprising:
adding a new media file added to the at least one data storage, examining at least one tag associated with the new media file, and based thereon assigning the new media file to at least one category segment at one or more levels of the hierarchical structure.

20. The method according to claim 19, comprising assigning a position for the new media file relative to any media files already organized in the hierarchical structure, the position being assigned based on the at least one tag associated with the new media file relative to a respective at least one tag associated with the media files already organized in the hierarchical structure.

21. The method according to claim 13, comprising receiving the operator-generated commands in the form of navigation instructions relative to the hierarchical structure, the navigation instructions expressing at least one of:
traversal between different category segments at a particular layer,
traversal between graphic representations of different media files at the bottom-level layer, and
alteration of layers.

22. The method according to claim 13, comprising receiving the operator-generated commands in the form of a selection of a media file.

23. The method according to claim 22, wherein the operator-generated commands comprise an instruction pertaining to displaying the feature listing associated with a selected media file.

24. The method according to claim 22, wherein the operator-generated commands comprise an instruction to reproduce a selected media file in a media player.

25. A computer program product loadable into a memory of a data-processing apparatus, comprising software for controlling, when said program is run on the data-processing apparatus, the steps of:
presenting graphical representations of media files on a format comprehensible to a human user,
organizing the media files according to a hierarchical structure based on the at least one tag associated with each file, and cause the output interface to present information reflecting said structure, the structure comprising a top-level layer and a bottom-level layer, the top-level layer containing a two-dimensional layout of at least two category segments, each category segment being associated with one or more of the media files, each category segment representing an area delimited by a number of edges, and each category segment adjoining at least one other segment along at least one of its edges, an edge between a first category segment and a second category segment designating that the media files associated with the first category segment are different from the media files associated with the second category segment with respect to at least one disparity criterion, the category segments being organized such that the media files included in adjacent category segments are more similar to one another than the media files included in non-adjacent category segments, the bottom-level layer comprising a graphic representation of an individual file of the media files,
receiving operator-generated commands, and in response thereto
presenting an adjusted graphical representation of the media files,
determine an intensity parameter reflecting a frequency at which each media file has been reproduced relative to the other the media files included in the hierarchical structure, and
assign the contents of at least one of the at least one variable data field in response to an intensity parameter.

26. The computer program product according to claim 25, wherein the hierarchical structure comprises at least one intermediate layer between the top-level layer and the bottom-level layer, each intermediate layer representing sub-divisions of one or more category segments of a layer at a hierarchical level above said intermediate layer, each intermediate layer containing a two-dimensional layout of at least two category segments, where each category segment is associated with one or more of the media files, each category segment representing an area delimited by a number of edges, and each category segment adjoining at least one other category segment along at least one of its edges, an edge between a first category segment and a second category segment designating that the media files associated with the first category segment are different from the media files associated with the second category segment with respect to at least one disparity criterion, the at least one disparity criterion being defined in relation to the sub-divisions at the intermediate layer.

27. The computer program product according to claim 25, wherein the data-processing apparatus further controls presenting a feature listing together with the graphic representation of the individual file at the bottom-level layer, the feature listing being included in the at least one tag associated with the file and the feature listing comprising data revealing at least one characterizing feature of the file.

28. The computer program product according to claim 27, wherein the feature listing comprises the at least one variable data field, and the method comprising assigning the contents of the least one variable data field in response operator-generated commands received in respect of the media file to which the feature listing is associated.

29. The computer program product according to claim 28, wherein the data-processing apparatus further controls presenting at least one graphic representation at one or more layers of the hierarchical structure which graphic representation visualizes the intensity parameter in respect of at least one media file.

30. The computer program product according to claim 29, wherein the intensity parameter is reflected by color, and a magnitude of the parameter is expressed by at least one of a tone and an intensity of at least one color assigned to at least one onscreen object presented via the output interface.

31. The computer program product according to claim 25, wherein the data-processing apparatus further controls:
adding a new media file added to the at least one data storage,
examining at least one tag associated with a new media file added to the at least one data storage, and based thereon assigning the new media file to at least one category segment at one or more levels of the hierarchical structure.

32. The computer program product according to claim 31, wherein the data-processing apparatus further controls assigning a position for the new media file relative to any media files already organized in the hierarchical structure, the position being assigned based on the at least one tag associated with the new media file relative to a respective at least one tag associated with the media files already organized in the hierarchical structure.

33. The computer program product according to claim 25, wherein the data-processing apparatus further controls receiving the operator-generated commands in the form of navigation instructions relative to the hierarchical structure, the navigation instructions expressing at least one of:
traversal between different category segments at a particular layer,
traversal between graphic representations of different media files at the bottom-level layer, and
alteration of layers.

34. The computer program product according to claim 25, wherein the data-processing apparatus further controls receiving the operator-generated commands in the form of a selection of a media file.

35. The computer program product according to claim 34, wherein the operator-generated commands comprise an instruction pertaining to displaying the feature listing associated with a selected media file.

36. The computer program product according to claim 34, wherein the operator-generated commands comprise an instruction to reproduce a selected media file in one of the at least one media player.

37. A computer readable storage medium, having a program recorded thereon, where the program is to make a data-processing apparatus control, when said program is load into the data-processing apparatus, the steps of:
presenting graphical representations of media files on a format comprehensible to a human user,
organizing the media files according to a hierarchical structure based on the at least one tag associated with each file, and cause the output interface to present information reflecting said structure, the structure comprising a top-level layer and a bottom-level layer, the top-level layer containing a two-dimensional layout of at least two category segments, each category segment being associated with one or more of the media files, each category segment representing an area delimited by a number of edges, and each category segment adjoining at least one other segment along at least one of its edges, an edge between a first category segment and a second category segment designating that the media files associated with the first category segment are different from the media files associated with the second category segment with respect to at least one disparity criterion, the category segments being organized such that the media files included in adjacent category segments are more similar to one another than the media files included in non-adjacent category segments, the bottom-level layer comprising a graphic representation of an individual file of the media files,
receiving operator-generated commands, and in response thereto
presenting an adjusted graphical representation of the media files,
determine an intensity parameter reflecting a frequency at which each media file has been reproduced relative to the other the media files included in the hierarchical structure, and
assign the contents of at least one of the at least one variable data field in response to an intensity parameter.

38. The computer readable storage medium according to claim 37, wherein the hierarchical structure comprises at least one intermediate layer between the top-level layer and the bottom-level layer, each intermediate layer representing sub-divisions of one or more category segments of a layer at a hierarchical level above said intermediate layer, each intermediate layer containing a two-dimensional layout of at least two category segments, where each category segment is associated with one or more of the media files, each category segment representing an area delimited by a number of edges, and each category segment adjoining at least one other category segment along at least one of its edges, an edge between a first category segment and a second category segment designating that the media files associated with the first category segment are different from the media files associated with the second category segment with respect to at least one disparity criterion, the at least one disparity criterion being defined in relation to the sub-divisions at the intermediate layer.

39. The computer readable storage medium according to claim 37, wherein the data-processing apparatus further controls presenting a feature listing together with the graphic representation of the individual file at the bottom-level layer, the feature listing being included in the at least one tag associated with the file and the feature listing comprising data revealing at least one characterizing feature of the file.

40. The computer readable storage medium according to claim 39, wherein the feature listing comprises the at least one variable data field, and the method comprising assigning the contents of the least one variable data field in response operator-generated commands received in respect of the media file to which the feature listing is associated.

41. The computer readable storage medium according to claim 40, wherein the data-processing apparatus further controls presenting at least one graphic representation at one or more layers of the hierarchical structure which graphic representation visualizes the intensity parameter in respect of at least one media file.

42. The computer readable storage medium according to claim 41, wherein the intensity parameter is reflected by color, and a magnitude of the parameter is expressed by at least one of a tone and an intensity of at least one color assigned to at least one onscreen object presented via the output interface.

43. The computer readable storage medium according to claim 37, wherein the data-processing apparatus further controls:
adding a new media file added to the at least one data storage,
examining at least one tag associated with a new media file added to the at least one data storage, and based thereon assigning the new media file to at least one category segment at one or more levels of the hierarchical structure.

44. The computer readable storage medium according to claim 43, wherein the data-processing apparatus further controls assigning a position for the new media file relative to any media files already organized in the hierarchical structure, the position being assigned based on the at least one tag associated with the new media file relative to a respective at least one tag associated with the media files already organized in the hierarchical structure.

45. The computer readable storage medium according to claim 37, wherein the data-processing apparatus further controls receiving the operator-generated commands in the form of navigation instructions relative to the hierarchical structure, the navigation instructions expressing at least one of:
- traversal between different category segments at a particular layer,
- traversal between graphic representations of different media files at the bottom-level layer, and
- alteration of layers.

46. The computer readable storage medium according to claim 37, wherein the data-processing apparatus further controls receiving the operator-generated commands in the form of a selection of a media file.

47. The computer readable storage medium according to claim 46, wherein the operator-generated commands comprise an instruction pertaining to displaying the feature listing associated with a selected media file.

48. The computer readable storage medium according to claim 46, wherein the operator-generated commands comprise an instruction to reproduce a selected media file in one of the at least one media player.

* * * * *